(12) United States Patent
Achour et al.

(10) Patent No.: US 8,320,922 B2
(45) Date of Patent: Nov. 27, 2012

(54) REGISTRATION IN A BROADCAST COMMUNICATIONS SYSTEM

(75) Inventors: Baaziz Achour, San Diego, CA (US); Lorenzo Casaccia, San Diego, CA (US); Ragulan Sinnarajah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 10/214,680

(22) Filed: Aug. 7, 2002

(65) Prior Publication Data

US 2004/0192302 A1 Sep. 30, 2004

(51) Int. Cl.
*H04W 72/00* (2009.01)

(52) U.S. Cl. ............. 455/450; 455/435.1; 455/509; 455/516

(58) Field of Classification Search ............. 455/435.1, 455/435.2, 517, 458, 456.1–456.6; 725/111, 725/135, 138–151; 370/351, 352, 389, 356, 370/428, 474, 469
See application file for complete search history.

(56) References Cited

U.S. PATENT DOCUMENTS

| | | | | |
|---|---|---|---|---|
| 4,742,512 A * | 5/1988 | Akashi et al. | .................. | 370/347 |
| 5,687,077 A * | 11/1997 | Gough, Jr. | ....................... | 700/29 |
| 5,697,077 A | 12/1997 | Saitoh | | |
| 5,797,087 A * | 8/1998 | Lee | ........................... | 455/181.1 |
| 5,809,419 A * | 9/1998 | Schellinger et al. | .......... | 455/434 |
| 6,108,519 A | 8/2000 | Nitta | | |
| 6,369,861 B1 * | 4/2002 | Lownes | ........................ | 348/731 |
| 6,438,123 B1 * | 8/2002 | Chapman | ....................... | 370/351 |
| 6,567,660 B1 * | 5/2003 | Wegener | ....................... | 455/418 |
| 6,571,391 B1 * | 5/2003 | Acharya et al. | .................. | 725/87 |
| 6,594,280 B1 * | 7/2003 | Chapman | ....................... | 370/469 |
| 6,628,639 B1 * | 9/2003 | Ishii | .............................. | 370/346 |
| 6,693,878 B1 * | 2/2004 | Daruwalla et al. | ............ | 370/235 |
| 6,734,804 B1 * | 5/2004 | Lee | ........................... | 340/825.72 |
| 6,950,653 B2 * | 9/2005 | Reid | .............................. | 455/423 |
| 6,957,063 B1 * | 10/2005 | Kall | .............................. | 455/414.1 |
| 7,113,738 B2 * | 9/2006 | Salurso et al. | ............... | 455/3.01 |
| 7,133,380 B1 * | 11/2006 | Winters et al. | ................ | 370/329 |
| 2002/0037735 A1 * | 3/2002 | Maggenti et al. | ............ | 455/517 |
| 2002/0176372 A1 * | 11/2002 | Ichikawa et al. | .............. | 370/254 |

(Continued)

FOREIGN PATENT DOCUMENTS

CN 1297656 A 5/2001

(Continued)

OTHER PUBLICATIONS

International Search Report—PCT/US/03/025009—International Search Authority—European Patent Office—Dec. 16, 2003.

*Primary Examiner* — Willie J Daniel, Jr.
(74) *Attorney, Agent, or Firm* — Kent D. Baker; Howard H. Seo

(57) ABSTRACT

Systems and techniques are disclosed relating to communications. The systems and techniques include an input device, generating a time period in response to a broadcast channel selection from the input device, generating a request to register the broadcast channel if the time period ends before receiving a second broadcast channel selection, and transmitting the request to an access network. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

20 Claims, 4 Drawing Sheets

U.S. PATENT DOCUMENTS

2004/0203773 A1* 10/2004 Balasubramanian et al. .................. 455/435.1
2007/0032234 A1* 2/2007 Jain et al. .................. 455/435.1

FOREIGN PATENT DOCUMENTS

| | | |
|---|---|---|
| EP | 0291068 | 11/1988 |
| EP | 1187380 | 3/2002 |
| JP | 63280524 | 11/1988 |
| JP | 10304453 | 11/1998 |
| JP | 11288421 | 10/1999 |
| JP | 2000201303 | 7/2000 |
| JP | 200378493 | 3/2003 |
| TW | 340293 | 9/1998 |
| TW | 493356 | 7/2002 |
| TW | 494695 | 7/2002 |
| WO | 99/52304 | 10/1999 |
| WO | WO0111914 | 2/2001 |

* cited by examiner

REGISTRATION IN A BROADCAST COMMUNICATIONS SYSTEM

BACKGROUND

1. Field

The present invention relates generally to broadcast communications systems, and more specifically, to systems and techniques for registration in a broadcast communications system.

2. Background

Radio refers to a system of communications using electromagnetic waves propagated through free space to link multiple radio devices. Radio is commonly used as a public medium to send commercial broadcasts from a radio transmitter to anyone with a radio receiver, and is often referred to as a point-to-multipoint medium. However, radio can also be used for private communications between two or more users over a point-to-point medium. Wireless telephones are common examples of radio transceivers configured to support point-to-point communications.

Various infrastructures have been developed over the years to support point-to-point communications. For example, in cellular communications, a base station controller is often used to support voice and data communications between a network and all base stations dispersed throughout a geographic area. The geographic area is typically divided into coverage regions known as cells. A base station is generally assigned to serve all subscriber stations in its cellular region. In some high traffic areas, the cellular region may be divided into sectors with one base station serving each sector. A user on a wireless subscriber station can access the network, or communicate with another wireless subscriber station, through one or more base stations.

With recent advancements in cellular technology, there has been an interest to utilize existing point-to-point cellular systems for broadcast services. The addition of commercial broadcasts into existing cellular systems requires the integration of broadcast services with those services currently provided to cellular users. The subscriber station needs to be able to function in both the broadcast mode and the point-to-point communications mode.

SUMMARY

In one aspect of the present invention, a method of communications includes selecting a broadcast channel, confirming that the broadcast channel remains selected for a period of time following the selection of the broadcast channel, and registering the broadcast channel with an access network in response to the end of the time period.

In another aspect of the present invention, a method of communications includes selecting a first broadcast channel, establishing a first time period in response to the first broadcast channel selection, preventing the first broadcast channel from being registered with an access network by deselecting the first broadcast channel before the end of the first time period, selecting a second broadcast channel, confirming that the second broadcast channel remains selected for a second period of time following the selection of the second broadcast channel, and registering the second broadcast channel with the access network at the end of the second time period.

In yet another aspect of the present invention, an apparatus includes an input device, a processor having a timer responsive to a broadcast channel selection from the input device, the processor being configured to generate a request to register the broadcast channel if the timer expires before receiving a second broadcast channel selection from the input device, and an analog front end configured to transmit the request to an access network.

In a further aspect of the present invention, computer readable media embodying a program of instructions executable by a computer program performs a method of communications, the method including receiving a broadcast channel selection, confirming that the broadcast channel remains selected for a period of time following the selection of the broadcast channel, and generating a request to register the broadcast channel with an access network in response to the end of the time period.

In yet a further aspect of the present invention, computer readable media embodying a program of instructions executable by a computer program performs a method of communications, the method including receiving a first broadcast channel selection, establishing a first time period in response to the first broadcast channel selection, preventing the generation of a request to register the first broadcast channel with an access network in response to a first broadcast channel deselection before the end of the first time period, receiving a second broadcast channel selection, confirming that the second broadcast channel remains selected for a second period of time following the selection of the second broadcast channel, and generating a request to register the second broadcast channel with the access network at the end of the second time period.

In another aspect of the present invention, an apparatus includes an input device, means for generating a time period in response to a broadcast channel selection from the input device, means for generating a request to register the broadcast channel if the time period ends before receiving a second broadcast channel selection, and means for transmitting the request to an access network.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

Figure 1:
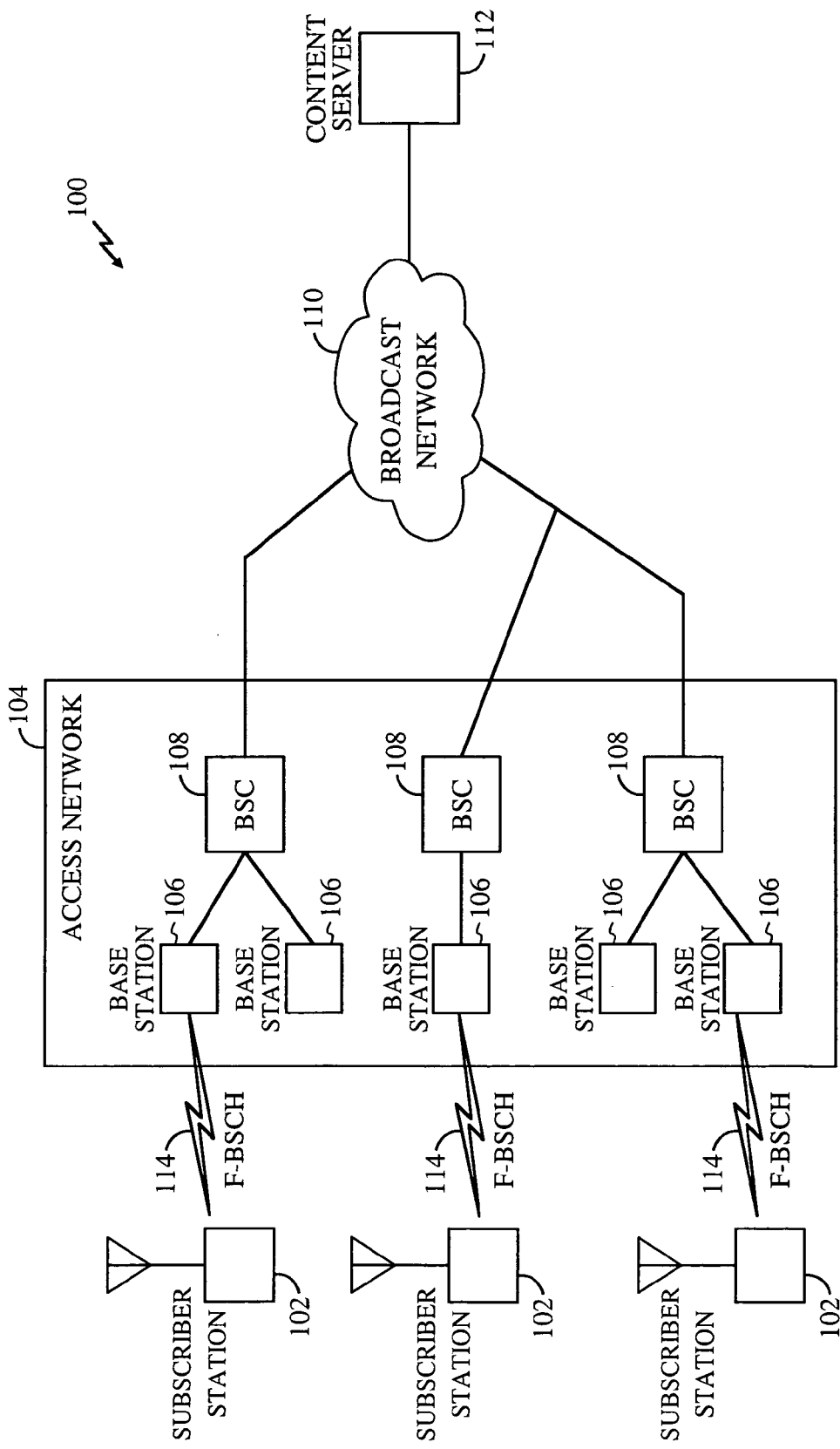
FIG. 1 is a conceptual block diagram of an exemplary communications system supporting high speed broadcast services over an existing wireless cellular infrastructure.

FIG. 1 is a conceptual block diagram of an exemplary communications system 100 capable of providing high speed broadcast services over an existing wireless cellular infrastructure. The existing wireless cellular infrastructure allows a user on a wireless subscriber station 102 to communicate with other wireless subscriber stations through an access network 104. The access network 104 includes a collection of base stations 106 and one or more base station controllers (BSC) 108. The access network 104 may further be connected to additional networks outside the access network, such as a broadcast network 110, and may transport data packets between each subscriber station 102 and the broadcast network 110. The broadcast network may include one or more content servers 112. Alternatively, one or more content servers 112 can be located outside the broadcast network 110. In any event, the content server 112 generates data packets containing programming from one or more broadcast channels, e.g., CBS, NBC, ABC, FOX, ESPN, etc.

The exemplary communication system 100 enables high speed broadcast services by introducing a forward broadcast shared channel (F-BSCH) 114 capable of high data rates that can be received by a large number of subscriber stations 102. The F-BSCH 114 is a forward link "physical" channel that carries one or more broadcast channels at a fixed carrier frequency. The broadcast channels are referred to as a forward link "logical" channels because they are distinguished from on another with a broadcast channel identifier appended to each data packet. In theory, a single F-BSCH could be used to deliver all broadcast channels to the subscriber stations 102. As a practical matter, however, the use of a single F-BSCH to handle all broadcast channels is not very feasible due mainly to bandwidth limitations. Accordingly, the broadcast channels should be allocated among multiple F-BSCHs each having a different carrier frequency.

To support point-to-point communications, a paging channel should be assigned to each F-BSCH carrier frequency. The paging channel can be used by the base station to page a subscriber station when a call arrives. By assigning a page channel to each F-BSCH carrier frequency, the user can always receive a page regardless of which broadcast channel the user has selected. A registration procedure can be used to ensure that the base station pages the subscriber station at the appropriate carrier frequency. The registration procedure can be performed in various ways depending on the particular design parameters for any given application. For example, the subscriber station can be configured to register with the access network every time the user selects a different broadcast channel. This registration procedure will provide a mechanism for the base station to know which frequency the subscriber station can be found when a call arrives.

Figure 2:
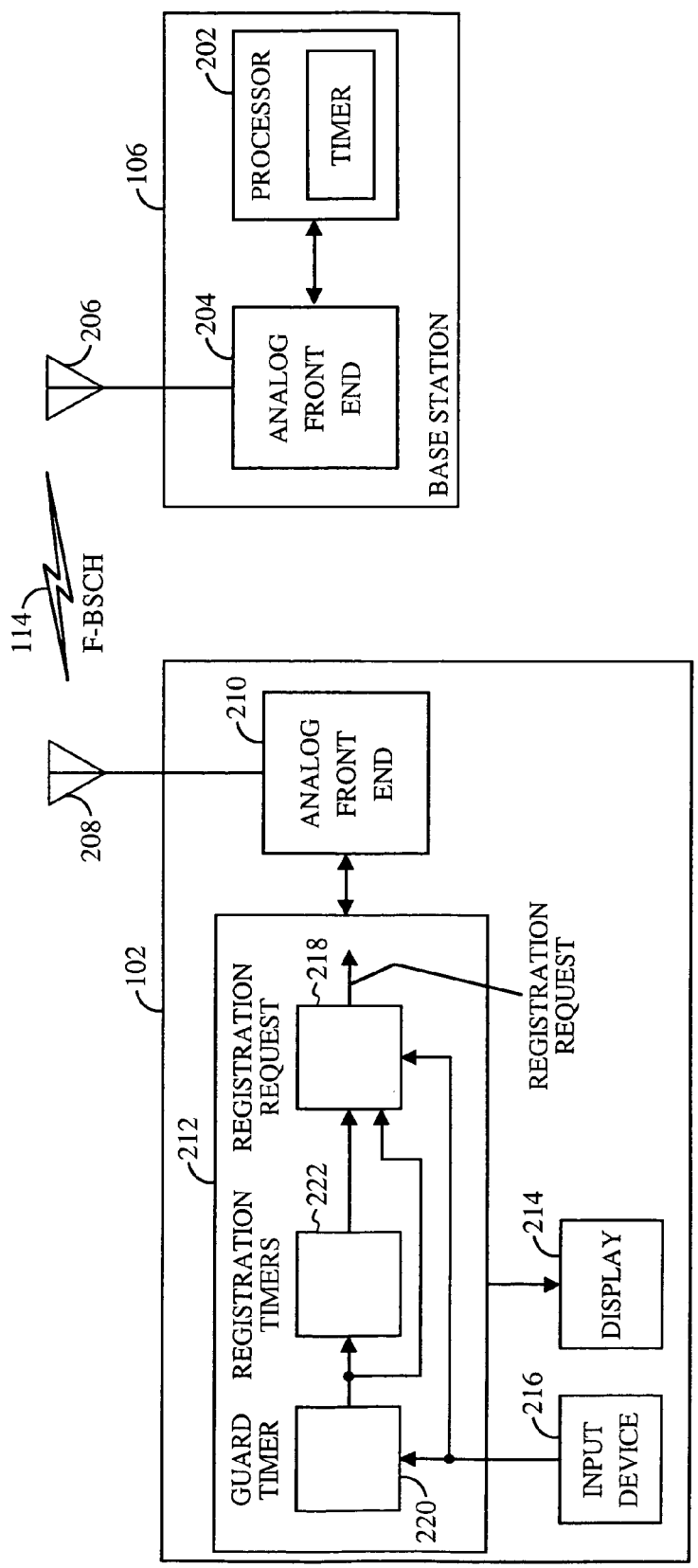
FIG. 2 is a functional block diagram of a subscriber station communicating with a base station in the exemplary communications system of FIG. 1.

FIG. 2 is a functional block diagram of a base station communicating with a subscriber station in the exemplary communications system of FIG. 1. In the broadcast mode, data packets from the BSC (not shown) are received by a processor 202 through a backhaul. The processor 202 can provide various signal processing functions such as encoding and modulation of the data packets, and conversion to an analog signal. The analog signal can be provided to an analog front end (AFE) 204 where it is upconverted to the appropriate carrier frequency for transmission to the subscriber station 102. The AFE 204 can also provide filtering and amplification before transmission over the F-BSCH via an antenna 206.

At the subscriber station 102, the broadcast is received by an antenna 208 and provided to an AFE 210. The AFE 210 includes a tuner which selects one physical channel, i.e., F-BSCH. The AFE also amplifies, filters and downconverts the selected F-BSCH to a baseband signal. The baseband signal can be coupled to a processor 212 that provides the inverse processing functions performed at the base station 106, specifically the demodulating and decoding, to recover the broadcast content. The broadcast content can then be provided to the user via a display 214. A user input device 216, such as a keypad or the like, can be used to select the broadcast channels. The user input device 216 can be coupled to the processor 212 where the logical broadcast channels selected by the user can be used to generate registration requests 218 for registering the broadcast channels with the access network. In a manner to be described in greater detail later, a guard timer 220 and a number of registration timers 222 can be used to control the generation of the registration requests. The logical broadcast channels selected by the user can also be mapped to their physical channels, i.e., the F-BSCH, by the processor 212. Based on the mapping function performed by the processor 212, the tuner can be set to the appropriate frequencies to receive the broadcast channels selected by the user.

The registration procedure can be performed in a variety of ways. In the described exemplary embodiment, the subscriber station processor maintains a registration timer for each broadcast channel subscribed to by the user of the subscriber station. When power is initially applied to the subscriber station, the subscriber station processor resets the registration timers for each broadcast channel. The subscriber station processor then sets the tuner to the designated frequency for registration with the access network using conventional hashing procedures for point-to-point communications or any other procedures known in the art. When the user selects a broadcast channel to receive broadcast services from a content server, the subscriber station processor registers the selected broadcast channel with the access network and starts the registration timer for that broadcast channel. The registration process involves transmitting a registration request from the subscriber station to the access network. The registration request is generated by the subscriber station processor and includes the broadcast channel selected by the user. If the broadcast channel remains selected when the registration timer expires, the subscriber station processor reregisters the selected broadcast channel with the access network and restarts the registration timer for the selected broadcast channel. When the user selects a different broadcast channel, the subscriber station processor registers the new broadcast channel with the access network and starts the registration timer for that broadcast channel.

The base station processor maintains a "paging set" for the subscriber station as well as a separate registration timer for each broadcast channel subscribed to by the user of the subscriber station. Upon receiving a power-up registration, the paging set for the subscriber station is initialized to include the frequency of the paging channel designated for point-to-point communications. When the base station processor receives a request to register a broadcast channel from the subscriber station, the base station processor adds the broadcast channel to the paging set and starts the registration timer for that broadcast channel. The registration timer can be retriggered by subsequent registration requests from the subscriber station. Should the registration timer expire, the base station processor removes the broadcast channel from the paging set.

When there is an incoming call for the subscriber station, the base station processor maps the contents of the paging set to the physical channels, i.e., F-BSCHs, to determine the carrier frequency for each broadcast channel in the paging set. The base station then sends a paging message to the subscriber station over each carrier frequency as well as the designated frequency for the paging channel for point-to-point communications. By sending a paging message on all frequencies carrying one or more broadcast channels with active registration timers, the chances of missing a page when the user is switching between multiple broadcast channels near or about the time an incoming call arrives is reduced.

The registration timers at the subscriber station should be synchronized with the corresponding registration timers at the base station, or the registration timers at the base station should not expire before their corresponding registration timers at the subscriber station. If the registration timer at the base station expires before the corresponding registration timer at the subscriber station, the base station may prematurely remove a broadcast channel from the paging set, while the subscriber station remains at that broadcast channel.

A guard timer can be used to avoid sending numerous registration requests to the access network when the user is browsing through the broadcast channels before deciding which broadcast channel to select. The guard timer can be triggered when the user selects a broadcast channel and the registration of that broadcast channel can be delayed until the guard timer expires. The guard timer can be implemented with a single retriggerable timer responsive to each broadcast channel selection. In this configuration, the guard timer is constantly retriggered as the user browses through the broadcast channels and does not expire until the user remains on one broadcast channel for a predetermined period of time. Alternatively, the guard timer can be implemented with a separate timer for each broadcast channel. In this configuration, a broadcast channel would be registered with the access network only if it remained selected when its respective timer expired. In any event, once a broadcast channel remains selected for a period of time set by the guard timer, a registration request can be sent to the access network and the registration timer for that broadcast channel can be started. Should the user deselect and then return to the broadcast channel while the registration timer is active, the guard timer should nonetheless be started. If the guard timer is active when the registration timer expires, the registration of the broadcast channel should be delayed until the guard timer expires. In other words, a broadcast channel should not be registered with the access network until the guard timer expires regardless of the state of its registration timer.

The time period for the guard timer and the registration timers can be fixed, or alternatively, can be configurable parameters transmitted to the subscriber station by the base station. The time period for the guard timer and registration timers may be selected based on user behavior statistics, number of broadcast channels transmitted, network loading, or any other relevant parameters known to those skilled in the art. The time period for the guard timer should be shorter than the time period for the registration timers. The time period for the guard timer should be relatively short to minimize the risk of missed pages due to delayed registration. The time period for the registration timers, on the other hand, should be relatively long to reduce bandwidth demands for registration. However, as those skilled in the art will recognize, the time period for the guard timer does not necessarily have to be shorter than the time period for the registration timers, and the actual relative time periods between the guard timer and the registration timers can be set for any values depending on the particular application and the overall design constraints.

As indicated earlier, the registration request includes the broadcast channel that is selected by the user. This information is needed by the base station to maintain the paging set. However, other related information may also be useful. For example, the particular broadcast channels that the user browses through before making a final selection may provide a content server with useful information for improving future programming. This information, however, may not be readily available if the subscriber station uses a guard timer that prevent the registration of broadcast channels that the user merely browses through. Accordingly, in at least one embodiment of the subscriber station, the processor includes memory that stores each selection made by the user regardless of the length of time the broadcast channel remains selected. Once a broadcast channel remains selected for a time period sufficient to expire the guard timer, a registration request can be transmitted to the access network with all the broadcast channels selected by the user since the last registration request. The registration request can use one or more bits appended to each broadcast channel to indicate whether the broadcast channel should be added to the paging set or whether the broadcast channel is being provided for statistical purposes only. The information from the registration request can be extracted at the base station and transported through the access network to the content server. The content server can use the information for creating a rating system, billing the user, and tracking user behavior.

Alternatively, the content server can control the content of the information provided by the subscriber station with a message sent to the subscriber station requesting that only certain broadcast channels be monitored. In communications systems where the content server is actively participating in the broadcast channel tracking function, the information can be transmitted from the subscriber station in a registration request or in a separate dedicated channel in response to inquiries from the content server.

Figure 3:
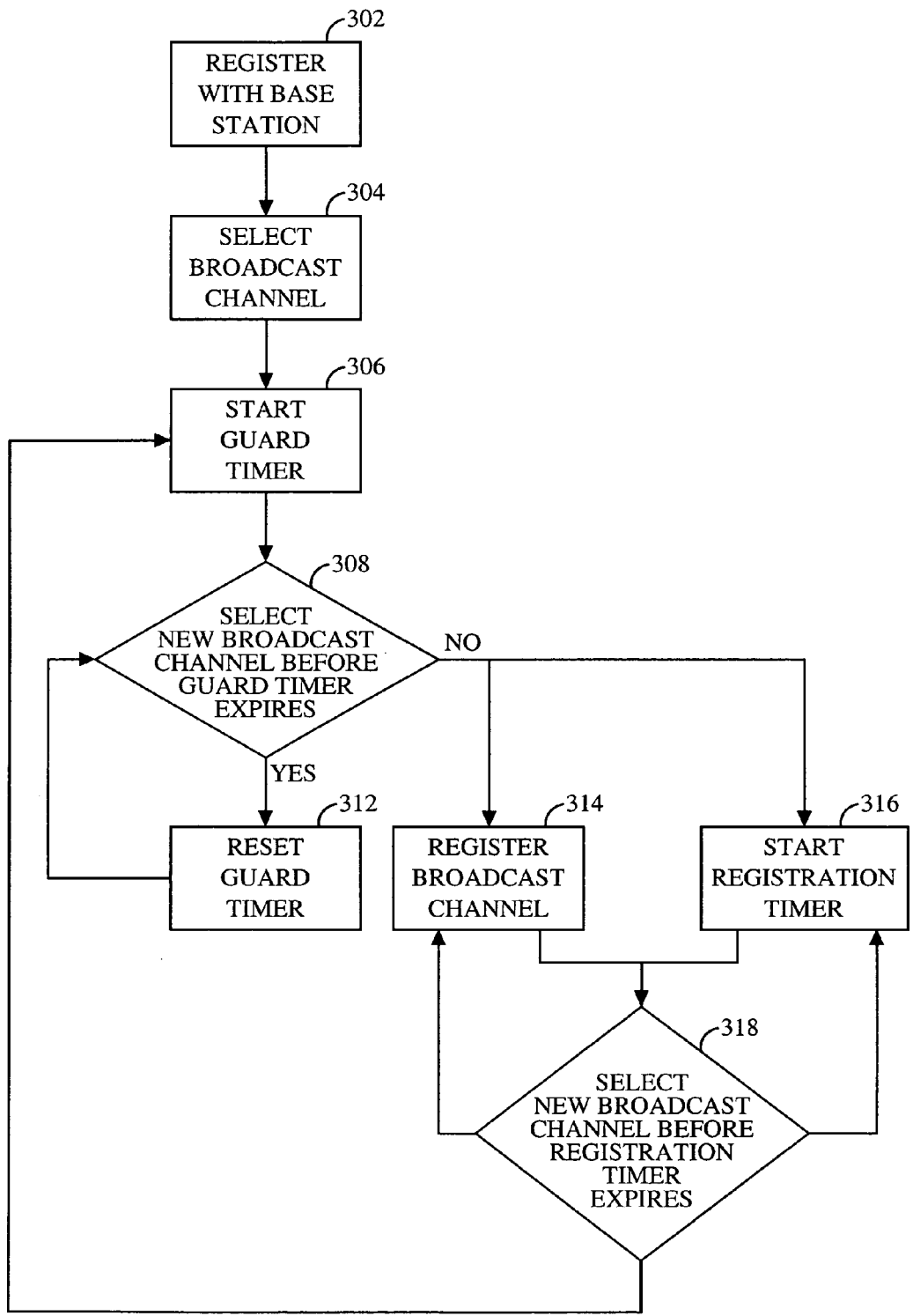
FIG. 3 is a flow chart illustrating an exemplary registration algorithm implemented by a processor residing in the subscriber station of FIG. 2.

FIG. 3 is a flow chart illustrating an exemplary registration algorithm which can be implemented by the subscriber station processor. The exemplary registration algorithm can be performed with communications software running on the subscriber station processor. The subscriber station processor can be a general purpose processor or a digital signal processor (DSP). Alternatively, the registration algorithm can be implemented with processor that is an application specific integrated circuit (ASIC), a field programmable gate array (FPGA) or other programmable logic device, discrete gate or transistor logic, discrete hardware components, or any combination thereof.

Returning to FIG. 3, the subscriber station processor registers with a base station for point-to-point communications in step 302. The user then selects a broadcast channel to receive broadcast services from a content server in step 304. In response, the subscriber station processor starts the guard timer in step 306 and monitors the user input device for other broadcast channel selections while the guard timer is active in step 308. If the subscriber station processor detects a new broadcast channel selection before the guard timer expires, the subscriber station processor restarts the guard timer in step 312 and loops back to step 308 to monitor the user input device for further broadcast channel selections. If the broadcast channel remains selected when the guard timer expires, the subscriber station processor registers the broadcast channel with the access network in step 314, starts the registration timer in step 316, and monitors the user input device for new broadcast channel selections while the registration timer is active in step 318. If a new broadcast channel is selected before the registration timer expires, the subscriber station processor loops back to step 306 to restart the guard timer. If the broadcast channel remains selected when the registration timer expires, the subscriber station processor loops back to step 314 to reregister the broadcast channel with the access network and step 316 to restart the registration timer.

The sequence of steps described above for the registration algorithm is by way of example and not by way of limitation. Those skilled in the art will appreciate that certain steps can be performed in any order, or carried out in parallel in an actual implementation. Moreover, one or more of the steps may be omitted or combined with other methods and processes known in the art.

Figure 4:
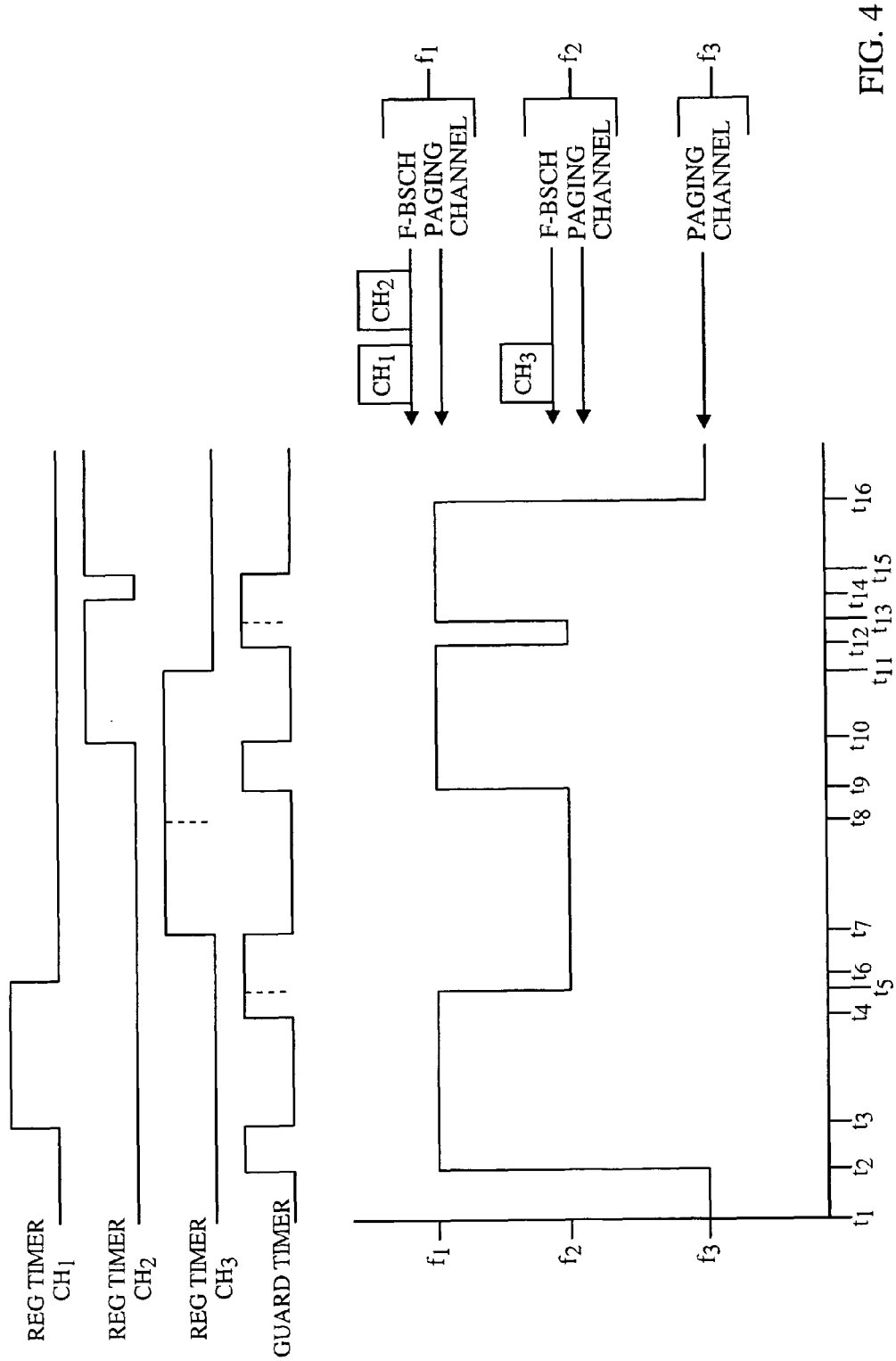
FIG. 4 is a timing diagram illustrating an exemplary registration scenario between a subscriber station and an access network using the registration algorithm described in connection with FIG. 3.

FIG. 4 is a timing diagram illustrating an exemplary registration scenario between a subscriber station and an access network using the registration algorithm described in connection with FIG. 3. The timing diagram includes a horizontal axis for "time" and a vertical axis showing the "carrier frequency" assignments for the physical channels below and the state of the various timers above. For the purposes of illustration, the paging channel for point-to-point communications will be represented as $f_3$. Two physical channels, i.e., F-BSCH, carrying broadcast services from a content provider will have frequency assignments represented as $f_1$ and $f_2$. One of the physical channels carries a single logical broadcast channel $CH_3$, and the other physical channel carries two logical broadcast channels $CH_1$ and $CH_2$.

At time $t_1$, power is applied to the subscriber station. The subscriber station processor sets the tuner frequency to $f_3$ for point-to-point communications using any procedure known in the art, resets the guard timer and registration timers, and registers with the base station. The base station initializes the subscriber station's paging set to include carrier frequency $f_3$.

At time $t_2$, the user selects one of the broadcast channels $CH_1$ on the user input device. The subscriber station processor sets the tuner frequency to $f_1$, and starts the guard timer.

At time $t_3$, the guard timer expires. The subscriber station processor starts the registration timer for the broadcast channel $CH_1$ and transmits a request to register the broadcast channel $CH_1$ to the access network. In response to the registration request, the base station adds the broadcast channel $CH_1$ to the paging set and starts its registration timer for the broadcast channel $CH_1$. At this point, the paging set includes $\{CH_1, f_3\}$.

At time $t_4$, the user selects another broadcast channel $CH_2$ on the user input device. The subscriber station processor starts the guard timer.

At time $t_5$, prior to the expiration of the guard timer, the user selects another broadcast channel $CH_3$ on the user input device. The subscriber station processor sets the tuner frequency to $f_2$ and restarts the guard timer.

At time $t_6$, the registration timer for the broadcast channel $CH_1$ expires. Because the user has selected a different broadcast channel, the subscriber station does not send a registration request to the access network for the broadcast channel $CH_1$, and as a result, the registration timer at the base station for the broadcast channel $CH_1$ will expire causing the base station to remove the broadcast channel $CH_1$ from the paging set. At this point, the paging set includes $\{f_3\}$.

At $t_7$, the guard timer expires. The subscriber station processor starts the registration timer for the broadcast channel $CH_3$ and transmits a request to register the broadcast channel $CH_3$ to the access network. In response to the registration request, the base station adds the broadcast channel $CH_3$ to the paging set and starts its registration timer for the broadcast channel $CH_3$. At this point, the paging set includes $\{CH_3, f_3\}$.

At time $t_8$, the registration timer for the broadcast channel $CH_3$ expires. Because the same broadcast channel $CH_3$ is still selected by the user, the subscriber station processor sends another request to register the broadcast channel $CH_3$ to the access network and restarts the registration timer for the broadcast channel $CH_3$. The base station will retain the broadcast channel $CH_3$ in the paging set in response to the registration request.

At time $t_9$, the user reselects the broadcast channel $CH_2$ on the user input device. The subscriber station processor sets the tuner frequency to $f_1$, and restarts the guard timer.

At time $t_{10}$, the guard timer expires. The subscriber station processor starts the registration timer for the broadcast channel $CH_2$ and transmits a request to register the broadcast channel $CH_2$ to the access network. In response to the registration request, the base station adds the broadcast channel $CH_2$ to the paging set and starts its registration timer for the broadcast channel $CH_2$. At this point, the paging set includes $\{CH_2, CH_3, f_3\}$.

At time $t_{11}$, the registration timer for the broadcast channel $CH_3$ expires. Because the user has selected a different broadcast channel, the subscriber station does not send a registration request to the access network for the broadcast channel $CH_3$, and as a result, the registration timer at the base station for the broadcast channel $CH_3$ will expire causing the base station to remove the broadcast channel $CH_3$ from the paging set. At this point, the paging set includes $\{CH_2, f_3\}$ At time $t_{12}$, the user reselects the broadcast channel $CH_3$ on the user input device. The subscriber station processor starts the guard timer.

At time $t_{13}$, prior to the expiration of the guard timer, the user reselects the broadcast channel $CH_2$ on the user input device. The subscriber station processor restarts the guard timer.

At time $t_{14}$, the registration timer for the broadcast channel $CH_2$ expires. However, since the guard timer has not expired, the subscriber station processor does not transmit a registration request to the access network nor does the subscriber station processor restart the registration timer for the broadcast channel $CH_2$. As a result, the registration timer at the base station for the broadcast channel $CH_2$ will expire causing the base station to remove the broadcast channel $CH_2$ from the paging set. At this point, the paging set includes $\{f_3\}$.

At time $t_{15}$, the guard timer expires. The subscriber station processor restarts the registration timer for the broadcast channel $CH_2$ and transmits a request to register the broadcast channel $CH_2$ to the access network. In response to the registration request, the base station adds the broadcast channel $CH_2$ back to the paging set and restarts its registration timer for the broadcast channel $CH_2$. At this point, the paging set includes $\{CH_2, f_3\}$.

At time $t_{16}$, a call for the subscriber station arrives at the base station. The base station maps the logical broadcast channels contained in the paging set to the physical channels supported by the communications system. The mapping function results in a carrier frequency $f_1$ for the broadcast channel $CH_2$. As a result, the base station sends a page to the subscriber station over carrier frequencies $f_1$ and $f_3$ The subscriber station processor will receive the page over carrier frequency $f_1$, and in response, set the tuner frequency to $f_3$ to negotiate the call parameters in the point-to-point communications mode. The registration timers in the subscriber station and base station can be reset at this time, or alternatively, allowed to expire. Either way, once the registration timers in the base station are reset (or expire), the base station will remove the broadcast channel $CH_2$ from the paging set in the absence of new registration request from the subscriber station.

Those of skill would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless subscriber station for use with an access network, the wireless subscriber station comprising:
an input device;
a processor including:
a guard timer configured to start in response to a first selection of a first broadcast channel and to restart in response to a second selection of a second broadcast channel made before the guard timer expires from the first selection, the second broadcast channel being different than the first broadcast channel, both the first selection and the second selection being made at the wireless subscriber station from the input device;
a registration timer configured to generate a first request to register the first broadcast channel in response to expiration of the registration timer started upon expiration of the guard timer, if the guard timer expires before being restarted by the second selection; and
an analog front end configured to transmit the first request to the access network and to select a paging channel to monitor, the paging channel identified according to the first request and specific to the first broadcast channel.

2. The wireless subscriber station of claim 1, wherein:
the processor is further configured to generate a second request to re-register the first broadcast channel if the first broadcast channel remains selected after the registration timer expires; and
the analog front end is further configured to transmit the second request to the access network.

3. The wireless subscriber station of claim 1, wherein the processor is further configured to maintain a list of viewed broadcast channels.

4. The wireless subscriber station of claim 3, wherein the processor is further configured to store the list of viewed broadcast channels.

5. The wireless subscriber station of claim 4, wherein the processor is further configured to forward the list to a base station that is serving the wireless subscriber station.

6. A method of wireless communications, comprising:
starting a guard timer in response to a first selection of a first broadcast channel and restarting the guard timer in response to a second selection of a second broadcast channel made before the guard timer expires from the first selection, the second broadcast channel being different than the first broadcast channel, both the first selection and the second selection being made at a wireless subscriber station from an input device of the wireless subscriber station;
generating a first request to register the first broadcast channel in response to expiration of a registration timer started upon expiration of the guard timer, and transmitting the first request to an access network if the guard timer expires before receiving the second selection; and
selecting a paging channel to monitor identified according to the first request and specific to the first broadcast channel.

7. The method of wireless communications of claim 6, further comprising generating a second request to re-register the first broadcast channel and transmitting the second request to the access network if the first broadcast channel remains selected after the registration timer expires.

8. The method of claim 6, further comprising maintaining a list of viewed broadcast channels.

9. The method of claim 8, further comprising storing the list of viewed broadcast channels.

10. The method of claim 9, further comprising forwarding the list to a base station that is serving the wireless subscriber station.

11. A wireless subscriber station for use with an access network, the wireless subscriber station comprising:

means for inputting a broadcast channel selection;

means for starting a guard timer in response to a first selection of a first broadcast channel and restarting the guard timer in response to a second selection of a second broadcast channel made before the guard timer expires from the first selection, the second broadcast channel being different than the first broadcast channel, both the first selection and the second selection being made at the wireless subscriber station;

means for generating a first request to register the first broadcast channel in response to expiration of a registration timer started upon expiration of the guard timer, and transmitting the first request to an access network if the guard timer expires before receiving the second selection; and means for selecting a paging channel to monitor identified according to the first request and specific to the first broadcast channel.

12. The wireless subscriber station of claim 11, further comprising means for generating a second request to re-register the first broadcast channel and transmitting the second request to the access network if the first broadcast channel remains selected after the registration timer expires.

13. The wireless subscriber station of claim 11, further comprising means for maintaining a list of viewed broadcast channels.

14. The wireless subscriber station of claim 13, further comprising means for storing the list of viewed broadcast channels.

15. The wireless subscriber station of claim 14, further comprising means for forwarding the list to a base station that is serving the wireless subscriber station.

16. A computer-readable storage device encoded with instructions executable by a processor to perform a method of wireless communications, the method comprising:

starting a guard timer in response to a first selection of a first broadcast channel and restarting the guard timer in response to a second selection of a second broadcast channel made before the guard timer expires from the first selection, the second broadcast channel being different than the first broadcast channel, both the first selection and the second selection being made at a wireless subscriber station from an input device of the wireless subscriber station;

generating a first request to register the first broadcast channel in response to expiration of a registration timer started upon expiration of the guard timer, and transmitting the first request to an access network if the guard timer expires before receiving the second selection; and selecting a paging channel to monitor identified according to the first request and specific to the first broadcast channel.

17. The computer readable media of claim 16, wherein the method further comprises generating a second request to re-register the first broadcast channel and transmitting the second request to the access network if the first broadcast channel remains selected after the registration timer expires.

18. The computer readable media of claim 16, wherein the method further comprises maintaining a list of viewed broadcast channels.

19. The computer readable media of claim 18, wherein the method further comprises storing the list of viewed broadcast channels.

20. The computer readable media of claim 19, wherein the method further comprises forwarding the list to a base station that is serving the wireless subscriber station.

\* \* \* \* \*